(12) United States Patent
Gauerhof et al.

(10) Patent No.: US 12,125,268 B2
(45) Date of Patent: Oct. 22, 2024

(54) METHOD AND DEVICE FOR TESTING THE ROBUSTNESS OF AN ARTIFICIAL NEURAL NETWORK

(71) Applicant: Robert Bosch GmbH, Stuttgart (DE)

(72) Inventors: Lydia Gauerhof, Sindelfingen (DE); Nianlong Gu, Wettingen (CH)

(73) Assignee: ROBERT BOSCH GMBH, Stuttgart (DE)

( * ) Notice: Subject to any disclaimer, the term of this patent is extended or adjusted under 35 U.S.C. 154(b) by 461 days.

(21) Appl. No.: 17/596,126

(22) PCT Filed: Jun. 10, 2020

(86) PCT No.: PCT/EP2020/066085
§ 371 (c)(1),
(2) Date: Dec. 3, 2021

(87) PCT Pub. No.: WO2020/260020
PCT Pub. Date: Dec. 30, 2020

(65) Prior Publication Data
US 2022/0222929 A1    Jul. 14, 2022

(30) Foreign Application Priority Data
Jun. 28, 2019  (DE) ..................... 10 2019 209 565.8

(51) Int. Cl.
*G06V 10/774* (2022.01)
*G06N 3/045* (2023.01)
*G06V 10/82* (2022.01)

(52) U.S. Cl.
CPC ......... *G06V 10/7747* (2022.01); *G06N 3/045* (2023.01); *G06V 10/82* (2022.01)

(58) Field of Classification Search
CPC .... G06V 10/7747; G06V 10/82; G06N 3/045; G06N 3/047; G06N 3/088
(Continued)

(56) References Cited

U.S. PATENT DOCUMENTS

| 2019/0251721 A1* | 8/2019 | Hua ...................... G06N 3/088 |
| 2020/0349393 A1* | 11/2020 | Zhong .................. G06V 10/776 |
| 2020/0349447 A1* | 11/2020 | Zhong .................... G06N 3/045 |

FOREIGN PATENT DOCUMENTS

EP         3477553 A1    5/2019

OTHER PUBLICATIONS

Akcay, et al.: "GANomaly: Semi-supervised Anomaly Detection via Adversarial Training", ACCV 2018: 14th Asian Conference on Computer Vision, Perth, Australia, Dec. 2-6, 2018. Berlin: Springer, 2019 (Lecture notes in computer science; 11363), pp. 622-637, ISBN 978-3-030-20893-6.
(Continued)

*Primary Examiner* — Juan A Torres
(74) *Attorney, Agent, or Firm* — NORTON ROSE FULBRIGHT US LLP; Gerard A. Messina

(57) ABSTRACT

A computer-implemented neural network system including a first machine learning system, in particular a first neural network, a second machine learning system, in particular a second neural network, and a third machine learning system, in particular a third neural network. The first machine learning system is designed to ascertain a higher-dimensional constructed image from a predefinable low-dimensional latent variable. The second machine learning system is designed to ascertain the latent variable again from the higher-dimensional constructed image, and the third machine learning system is designed to distinguish whether or not an image it receives is a real image.

19 Claims, 11 Drawing Sheets

(58) Field of Classification Search
USPC .......................................................... 382/159
See application file for complete search history.

(56) References Cited

OTHER PUBLICATIONS

Pidhorskyi, et al: "Generative Probabilistic Novelty Detection with Adversarial Autoencoders", Advances in Neural Processing Systems, 31 (2018), pp. 6822-6833, ISBN 978-1-5108-8447-2.

Pomerleau, Dean A.: "Input Reconstruction Reliability Estimation", Advances in Neural Processing Systems 5 (1993), pp. 279-286, ISBN—1-558-6027 4-7.

Sabokrou, et al.: "Adversarially Learned One-Class Classifier for Novelty Detection", 2018 IEEE/CVF Conference on Computer Vision and Pattern Recognition, Jun. 18-23, 2018, pp. 3379-3388, ISBN 978-1-5386-6420-9.

Santana and Hotz: "Learning a Driving Simulator", arXiv:1608, (2016), URL: https://arxiv.org/pdf/1608.01230 [accsessed on May 18, 2020].

International Search Report for PCT/EP2020/066085, Issued Sep. 11, 2020.

Hou et al., "Improving Variational Autoencoder With Deep Feature Consistent and Generative Adversarial Training," Cornell University, 2019, pp. 1-31. <https://arxiv.org/pdf/1906.01984.pdf> Downloaded Dec. 2, 2021.

Yuan et al., "Adversarial Examples: Attacks and Defenses for Deep Learning," Cornell University, 2018, pp. 1-20. <https://arxiv.org/pdf/1712.07107.pdf> Downloaded Dec. 2, 2021.

Hendrik Metzen et al., "On Detecting Adversarial Perturbations," Cornell University, 2017, pp. 1-12. <https://arxiv.org/abs/1702.04267> Downloaded Dec. 2, 2021.

Jianmin Bao et al., "Cvae-Gan: Fine-Grained Image Generation Through Asymmetric Training," Cornell University, 2017, pp. 1-10. <https://arxiv.org/pdf/1703.10155.pdf> Downloaded Dec. 2, 2021.

* cited by examiner

METHOD AND DEVICE FOR TESTING THE ROBUSTNESS OF AN ARTIFICIAL NEURAL NETWORK

FIELD

The present invention relates to a method for testing the robustness of an artificial neural network, a method for training the artificial neural network, a method for operating this artificial neural network, a training device, a computer program and a machine-readable memory medium

BACKGROUND INFORMATION

"CVAE-GAN: Fine-Grained Image Generation through Asymmetric Training", arXiv preprint arXiv: 1703.10155, 2017, Jianmin Bao, Dong Chen, Fang Wen, Houqiang Li, and Gang Hua provides an overview of conventional generative methods such as variational autoencoders and generative adversarial networks.

SUMMARY

An example embodiment of the present invention may have the advantage that a novel generative model is made available that is advantageously suitable both for the augmentation of image data and for an anomaly detection.

Additional aspects of the present invention are disclosed herein. Advantageous further developments and embodiments of the present invention are disclosed herein.

In a first aspect, the present invention relates to a computer-implemented neural network system. In accordance with an example embodiment of the present invention, the system includes a first machine learning system, which is also denoted as a generator, in particular a first neural network; a second machine learning system, also denoted as an encoder, in particular a second neural network; and a third machine learning system, also denoted as a discriminator, in particular a third neural network; the first machine learning system being developed to ascertain a higher-dimensional, constructed image from a predefinable low-dimensional latent variable; the second machine learning system being developed to ascertain the latent variable again from the higher-dimensional constructed image; and the third machine learning system being developed to distinguish whether or not an image it receives is a real image, i.e., an image recorded by a sensor. This reversed autoencoder of this network system offers the advantage that the dependency of latent features (such as the hair color of detected pedestrians) is extractable in a particularly simple manner so that augmentations of training datasets are especially easy. At the same time, an anomaly detection is able to be carried out in a particularly robust manner because the system is trainable in an adversarial fashion.

In another independent aspect, the present invention relates to a method for training the neural network system. In accordance with an example embodiment of the present invention, the first machine learning system, and especially only the first machine learning system, being trained to the effect that an activation in a predefinable feature map of the feature maps of the third machine learning system ideally assumes the same value when it receives a real image or an image of the real image reconstructed from a series connection made up of the second machine learning system and the first machine learning system. It has been shown that the training converges particularly well in this way.

In a further development of this aspect according to the present invention, it may be provided that the first machine learning system is trained also to the effect that the third machine learning system ideally does not recognize that an image it receives that was generated by the first machine learning system is no real image. This ensures a particularly robust anomaly detection.

Alternatively or additionally, it may be provided that the second machine learning system, and especially only the second machine learning system, is trained to the effect that a reconstruction of the latent variable ascertained by a series connection made up of the first machine learning system and the second machine learning system ideally is similar to the latent variable. It was recognized that the convergence of the method is considerably improved if this reconstruction is selected in such a way that only the parameters of the second machine learning system are trained because the cost functions of the encoder and the generator are otherwise difficult to be brought in line with each other.

In order to achieve the best possible improvement in the training result, in a further refinement of the present invention, it may be provided that the third machine learning system is trained to the effect that it ideally recognizes that an image it has received that was generated by the first machine learning system is no real image and/or that the third machine learning system is trained also to the effect that it ideally recognizes that an image it has received is a real image.

In a further independent aspect, the present invention relates to a method for monitoring the correct method of functioning of a machine learning system, in particular a fourth neural network, for the classification and/or the semantic segmentation of an input image (x) it receives, such as for detecting pedestrians and/or other road users and/or road signs, and a monitoring unit, which includes the first machine learning system trained by one of the above-described methods and the second machine learning system of the neural network system, the input image being conveyed to the second machine learning system, which ascertains a low-dimensional latent variable therefrom from which the first machine learning system ascertains a reconstruction of the input image, and a decision is made as a function of the input image and the reconstructed input image whether or not the machine learning system is robust.

If the machine learning system and the neural network system are trained using datasets that include the same input images, then the monitoring is particularly reliable since it is ensured in an especially uncomplicated manner that the statistical distributions of the training datasets are comparable (i.e., identical).

In a still further independent aspect, the present invention relates to a method for generating an augmented training dataset which includes input images for training a machine learning system that is designed for the classification and/or semantic segmentation of input images, and latent variables are ascertained from the input images with the aid of the second machine learning system of the neural network system, the input images being classified as a function of ascertained feature characteristics of their image data, and an augmented input image of the augmented training dataset is ascertained from at least one of the input images as a function of average values of the ascertained latent variables in at least two of the classes.

With the aid of this method, it is possible to analyze features of the images in the space of the latent variables (latent space) and to extract disentangled features so that particularly selective variation of the features of the images is possible in the described procedure.

The disentanglement of the features is particularly clean if the image classes are selected in such a way that the input images ($x^{(i)}$) classified therein agree with regard to their characteristics in a predefinable set of other features.

In this context it may advantageously be provided that the augmented input image is ascertained with the aid of the first machine learning system of the neural network system that was trained especially using an above-mentioned training method, as a function of an ascertained augmented latent variable. On that basis, a modified image is able to be generated in an efficient manner.

In order to modify a predefinable feature of an existing image in a very selective manner it may be provided that the augmented latent variable be ascertained from a predefinable one of the ascertained latent variables and a difference of the average values. On that basis, the feature of the image that corresponds to the predefinable one of the ascertained latent variables is varied.

To obtain the greatest possible multitude of new feature characteristics, it may be provided that the different be weighted by a predefinable weighting factor α. This particularly makes it possible to generate a multitude of training images whose features are varied to different extents.

For street scenes, for example, it is possible to vary the visual attributes of pedestrians in a multitude of characteristics and to thereby supply an especially large training or test dataset that ensures a very high coverage with regard to this feature.

It may then particularly be provided that the machine learning system be trained by the generated augmented training dataset if the monitoring by one of the above-mentioned monitoring methods has revealed that the machine learning system is not robust.

In further aspects, the present invention relates to a computer program which is designed to execute the above methods and to a machine-readable memory medium on which this computer program is stored.

In the following text, embodiments of the present invention are described in greater detail with reference to the figures.

DETAILED DESCRIPTION OF EXAMPLE EMBODIMENTS

Figure 1:
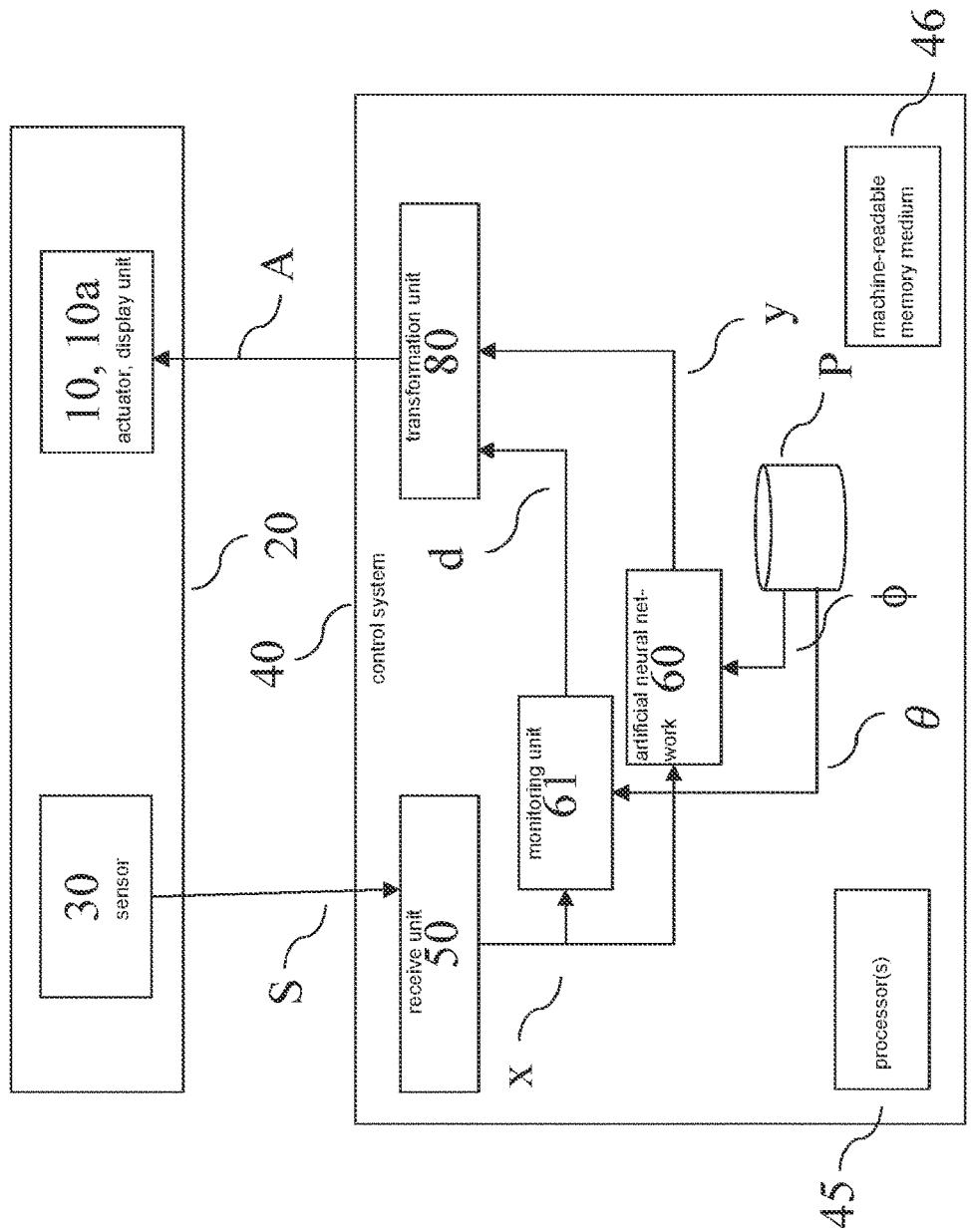
FIG. 1 shows schematically a structure of one embodiment of the present invention.

FIG. 1 shows an actuator 10 in its environment 20 in an interaction with a control system 40. At preferably regular time intervals, environment 20 is acquired in a sensor 30, in particular an imaging sensor such as a video sensor, which may also be provided as a plurality of sensors, e.g., a stereo camera. Other imaging sensors such as radar, ultrasound or lidar are also possible. A thermal imaging camera is another option. Sensor signal S—or an individual sensor signal S in the case of multiple sensors—of sensor 30 is transmitted to control system 40. Control system 40 thus receives a sequence of sensor signals S. On that basis, control system 40 ascertains actuation signals A, which are transmitted to actuator 10.

Control system 40 receives the sequence of sensor signals S from sensor 30 in an optional receive unit 50, which converts the sequence of sensor signals S into a sequence of input images x (a direct adoption of sensor signal S as input image x is possible as an alternative). Input image x, for example, may be a cutout or a further processing of sensor signal S. Input image x includes individual frames of a video recording. in other words, input image x is ascertained as a function of sensor signal S. The sequence of input images x is conveyed to a machine learning system, which is an artificial neural network 60 in the exemplary embodiment.

Artificial neural network 60 is preferably parameterized by parameters ϕ, which are stored in a parameter memory P and made available by this memory.

Artificial neural network 60 ascertains output variables y from input images x. These output variables y may particularly include a classification and/or a semantic segmentation of input images x. Output variables y are conveyed to an optional transformation unit 80, which uses them to ascertain actuation signals A, which are conveyed to actuator 10 in order to actuate actuator 10 appropriately. Output variable y includes information about objects that were detected by sensor 30.

Control system 40 furthermore includes a monitoring unit 61 for monitoring the mode of operation of artificial neural network 60. Input image x is also conveyed to monitoring unit 61. Monitoring unit 61 ascertains a monitoring signal d as a function thereof, which is likewise conveyed to transformation unit 80. Actuation signal A is also ascertained as a function of monitoring signal d.

Monitoring signal d characterizes whether or not neural network 60 ascertains output variables y in a reliable manner. If monitoring signal d characterizes an unreliability, it may be provided, for instance, that actuation signal A be ascertained according to a protected operating mode (while it is otherwise ascertained in a normal operating mode). The protected operating mode, for instance, may include a reduction of the dynamics of actuator 10 or that functionalities for actuating actuator 10 are switched off.

Actuator 10 receives actuation signals A, is actuated accordingly, and carries out a corresponding action. Actuator 10 may include a (not necessarily structurally integrated)

actuation logic, which ascertains a second actuation signal from actuation signal A, which will then be used to actuate actuator 10.

In further embodiments, control system 40 includes sensor 30. In still further embodiments, control system 40 alternatively or additionally also includes actuator 10.

In further preferred embodiments, control system 40 includes a single processor 45 or a plurality of processors 45 and at least one machine-readable memory medium 46 on which instructions are stored that induce control system 40 to carry out the method according to the present invention when the instructions are executed on processors 45.

In alternative embodiments, a display unit 10*a* is provided as an alternative or in addition to actuator 10.

Figure 2:
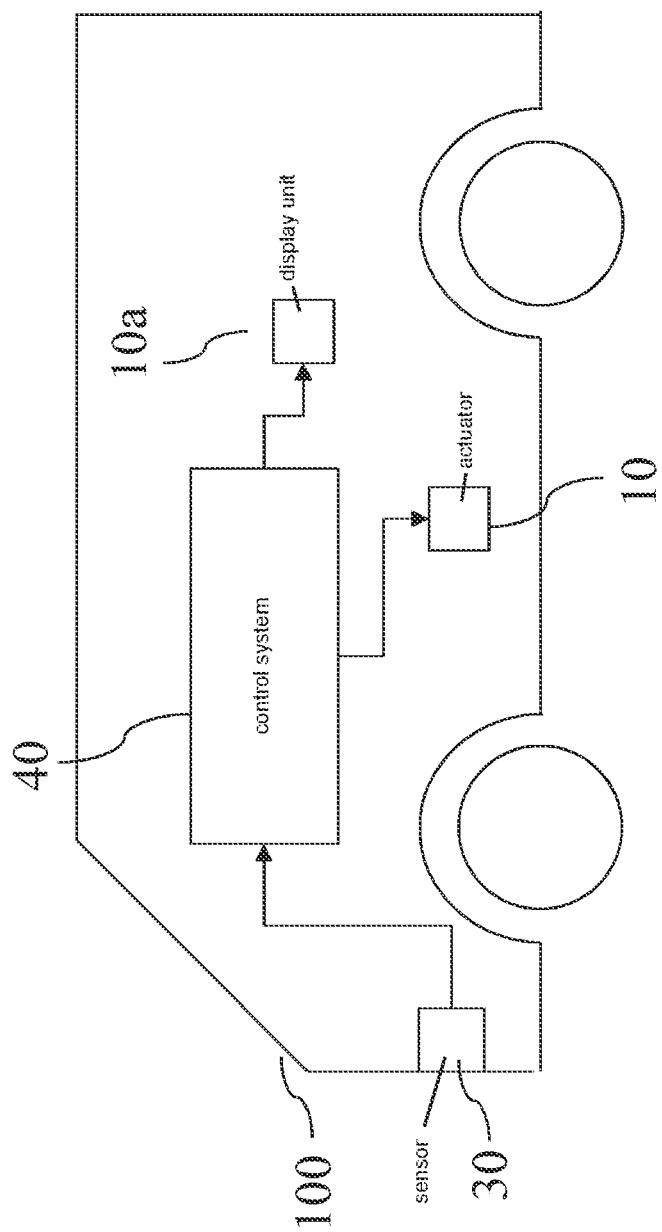
FIG. 2 shows schematically an exemplary embodiment for the control of an at least semiautonomous robot, in accordance with the present invention.

FIG. 2 shows the way in which control system 40 is able to be used for the control of an at least semiautonomous robot, in this case, an at least semiautonomous motor vehicle 100.

Sensor 30 may be a video sensor, for instance, which is preferably situated in motor vehicle 100.

Artificial neural network 60 is designed to reliably identify objects from input images x.

Actuator 10, which is preferably situated in motor vehicle 100, may be a brake, a drive or a steering system of motor vehicle 100, for example. Actuation signal A may then be determined in such a way that actuator or actuators 10 is or are actuated in such a manner, for instance, that motor vehicle 100 prevents a collision with the objects reliably identified by artificial neural network 60, in particular if they involve objects of certain classes such as pedestrians.

As an alternative, the at least semiautonomous robot may also be a different mobile robot (not shown), such as a robot which moves by flying, swimming, diving or walking. For example, the mobile robot may be an at least semiautonomous lawnmower or an at least semiautonomous cleaning robot. In these cases, as well, actuation signal A is able to be ascertained in such a way, for instance, that the drive and/or the steering system of the mobile robot is/are actuated so that the at least semiautonomous robot prevents a collision with objects identified by artificial neural network 60.

Alternatively or additionally, display unit 10*a* is able to be actuated by actuation signal A and the ascertained safe regions be displayed, for instance. In a motor vehicle 100 having a non-automated steering system, for example, it is additionally possible that display unit 10*a* is actuated by actuation signal A so that it outputs an optical or acoustic warning signal when it is ascertained that motor vehicle 100 is at risk of colliding with one of the reliably identified objects.

Figure 3:
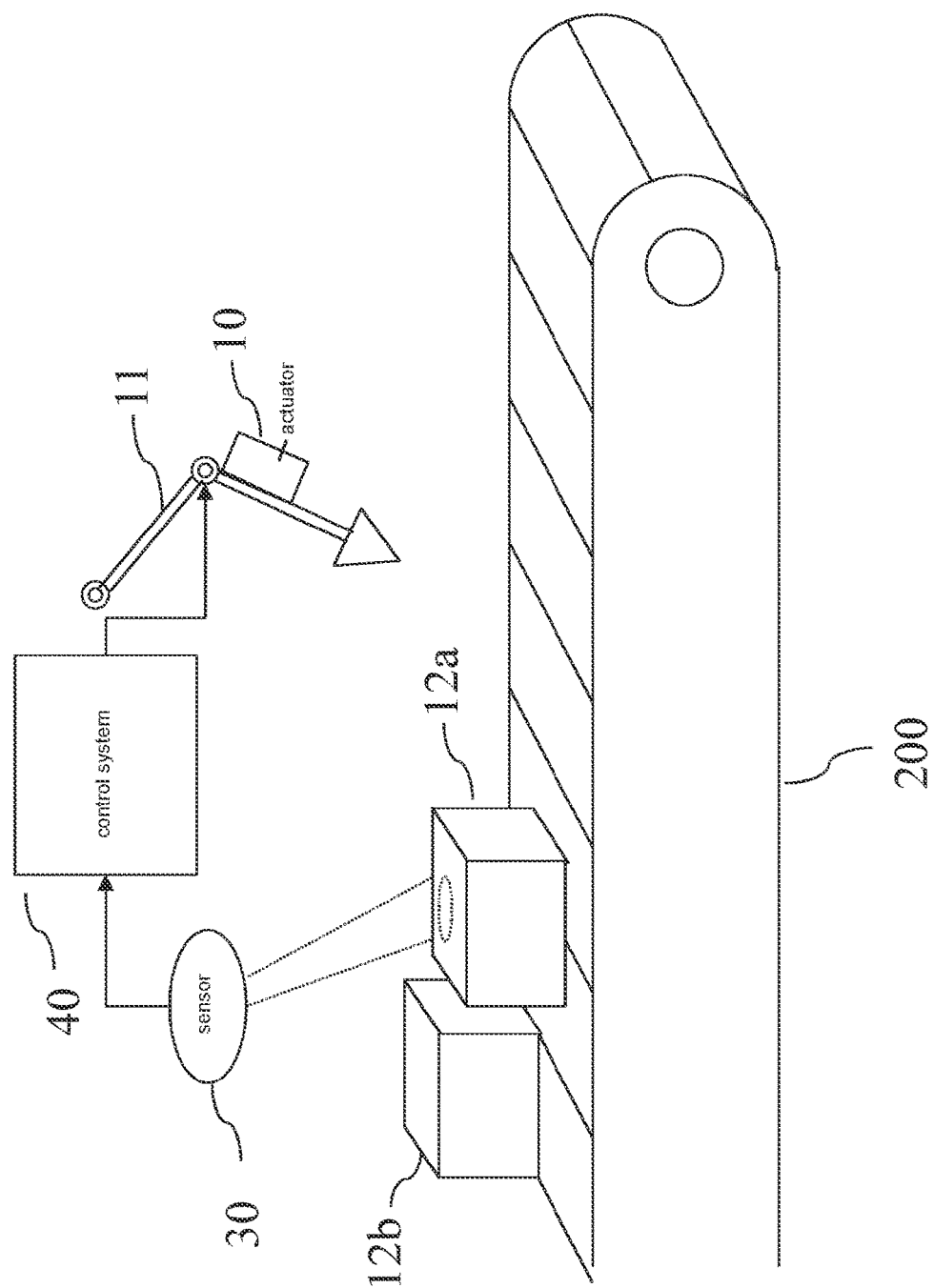
FIG. 3 shows schematically an exemplary embodiment for the control of a production system, in accordance with the present invention.

FIG. 3 shows an exemplary embodiment in which control system 40 is used for actuating a production machine 11 of a production system 200 by actuating an actuator 10 that controls this production machine 11. Production machine 11 may be a machine for punching, sawing, drilling and/or cutting, for instance.

For example, sensor 30 may then be an optical sensor, which detects properties of manufactured products 12*a*, 12*b*, for instance. These manufactured products 12*a*, 12*b* may be movable. It is possible that actuator 10, which controls production machine 11, is actuated as a function of an assignment of the detected manufactured products 12*a*, 12*b* so that production machine 11 appropriately carries out a subsequent processing step of the correct one of manufactured products 12*a*, 12*b*. It is also possible that through the identification of the correct properties of the same one of manufactured products 12*a*, 12*b* (that is to say, without an incorrect assignment), production machine 11 appropriately adapts the same production step for the processing of a subsequent manufactured product.

Figure 4:
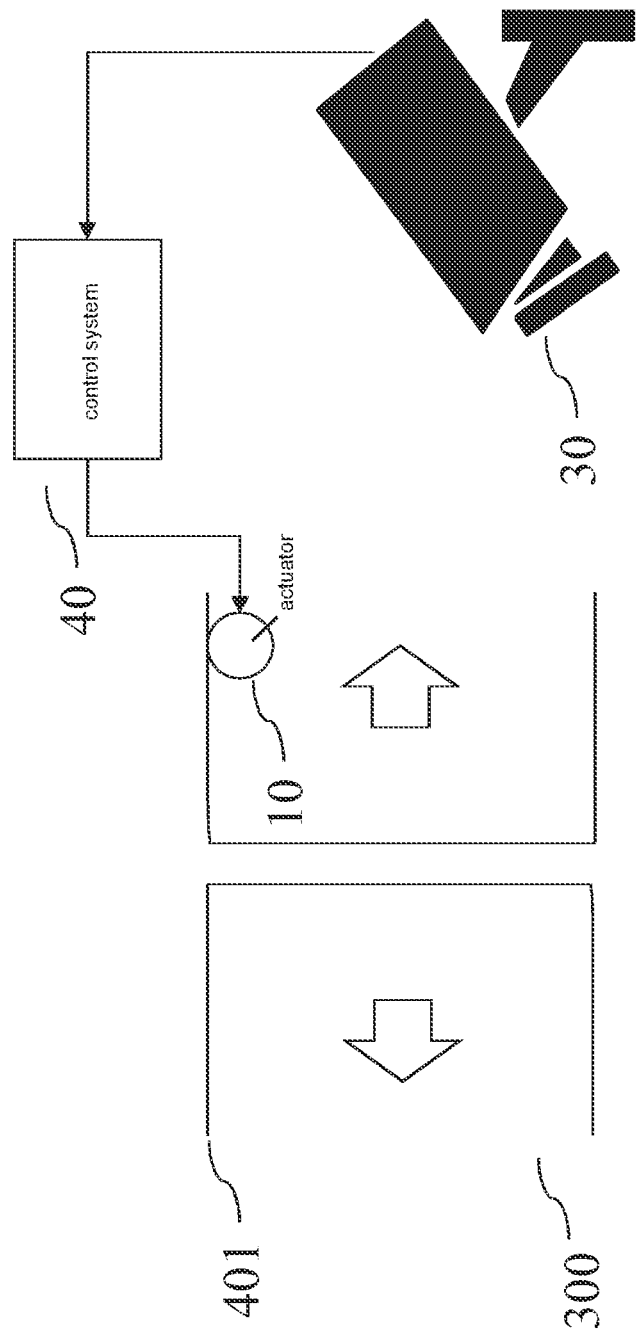
FIG. 4 shows schematically an exemplary embodiment for the control of an access system, in accordance with the present invention.

FIG. 4 shows an exemplary embodiment in which control system 40 is used for the control of an access system 300. Access system 300 may include a physical access control such as a door 401. Video sensor 30 is set up to detect a person. With the aid of object identification system 60, this detected image is able to be interpreted. If multiple persons are detected at the same time, for example, then an assignment of the persons (i.e., the objects) to one another makes it possible to ascertain the identity of the persons in an especially reliable manner, for instance by analyzing their movements. Actuator 10 may be a lock that releases or blocks the release of the access control, e.g., door 401, as a function of actuation signal A. To this end, actuation signal A may be selected as a function of the interpretation by object identification system 60, e.g., as a function of the ascertained identity of the person. Instead of the physical access control, a logical access control can be provided as well.

Figure 5:
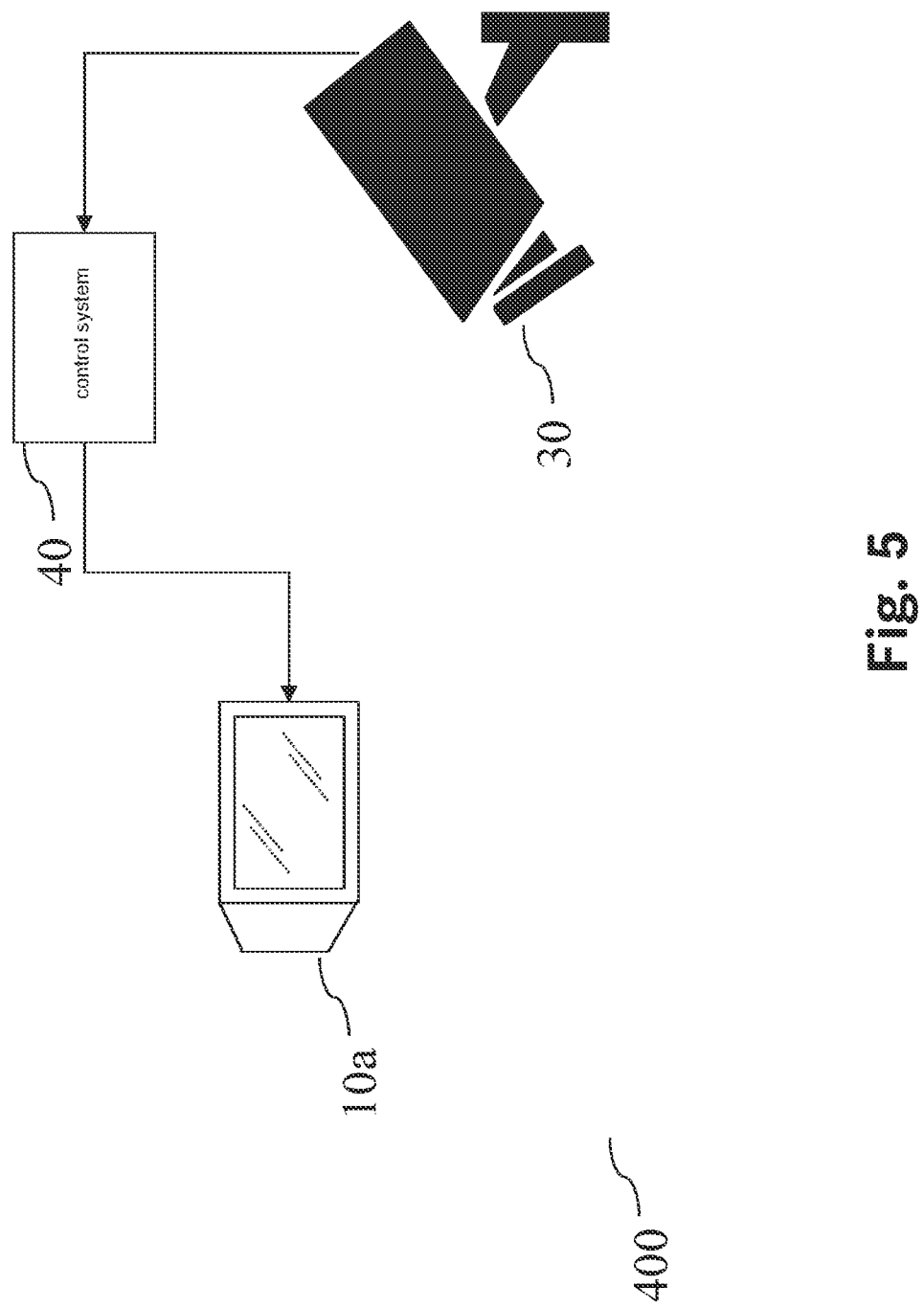
FIG. 5 shows schematically an exemplary embodiment for the control of a monitoring system, in accordance with the present invention.

FIG. 5 shows an exemplary embodiment in which control system 40 is used for the control of a monitoring system 400. This exemplary embodiment differs from the exemplary embodiment shown in FIG. 5 in that display unit 10*a* is provided instead of actuator 10, which is actuated by control system 40. For example, artificial neural network 60 is able to reliably ascertain an identity of the objects recorded by video sensor 30, for instance in order to infer which objects are suspicious as a function thereof, and actuation signal A may then be selected in such a way that display unit 10*a* displays this object in a color-coded, highlighted manner.

Figure 6:
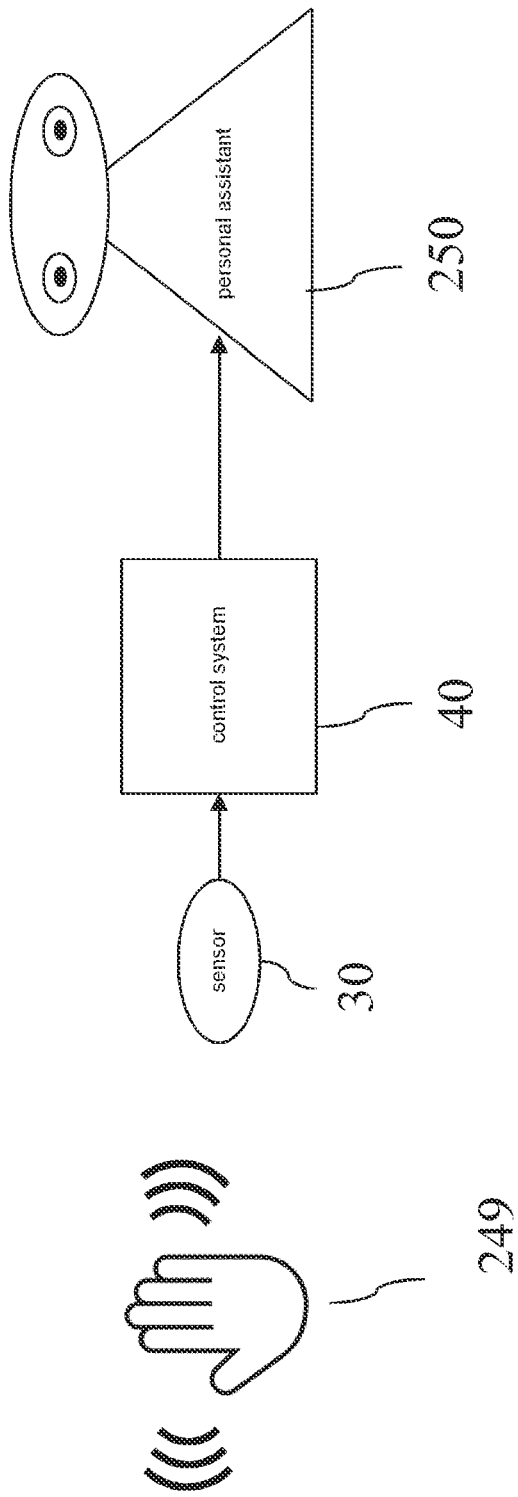
FIG. 6 shows schematically an exemplary embodiment for the control of a personal assistant, in accordance with the present invention.

FIG. 6 shows an exemplary embodiment in which control system 40 is used for the control of a personal assistant 250. Sensor 30 is preferably an optical sensor which receives images of a gesture of a user 249.

Depending on the signals of sensor 30, control system 40 ascertains an actuation signal A of personal assistant 250, for instance in that the neural network carries out a gesture detection. This ascertained actuation signal A is conveyed to personal assistant 250, which will then be actuated accordingly. This ascertained actuation signal A may particularly be selected so that it corresponds to an assumed desired actuation by user 249. This assumed desired actuation is able to be ascertained as a function of the gesture identified by artificial neural network 60. Control system 40 may then select control signal A for transmittal to personal assistant 250 as a function of the assumed desired actuation, and/or select actuation signal A for transmittal to the personal assistant according to the assumed desired actuation 250.

For example, this corresponding actuation may include that personal assistant 250 calls up information from a database and reproduces it in a manner that user 249 can receive.

Instead of personal assistant 250, a household appliance (not shown), especially a washing machine, a stove, an oven, a microwave unit or a dishwasher, may also be provided for a corresponding actuation.

Figure 7:
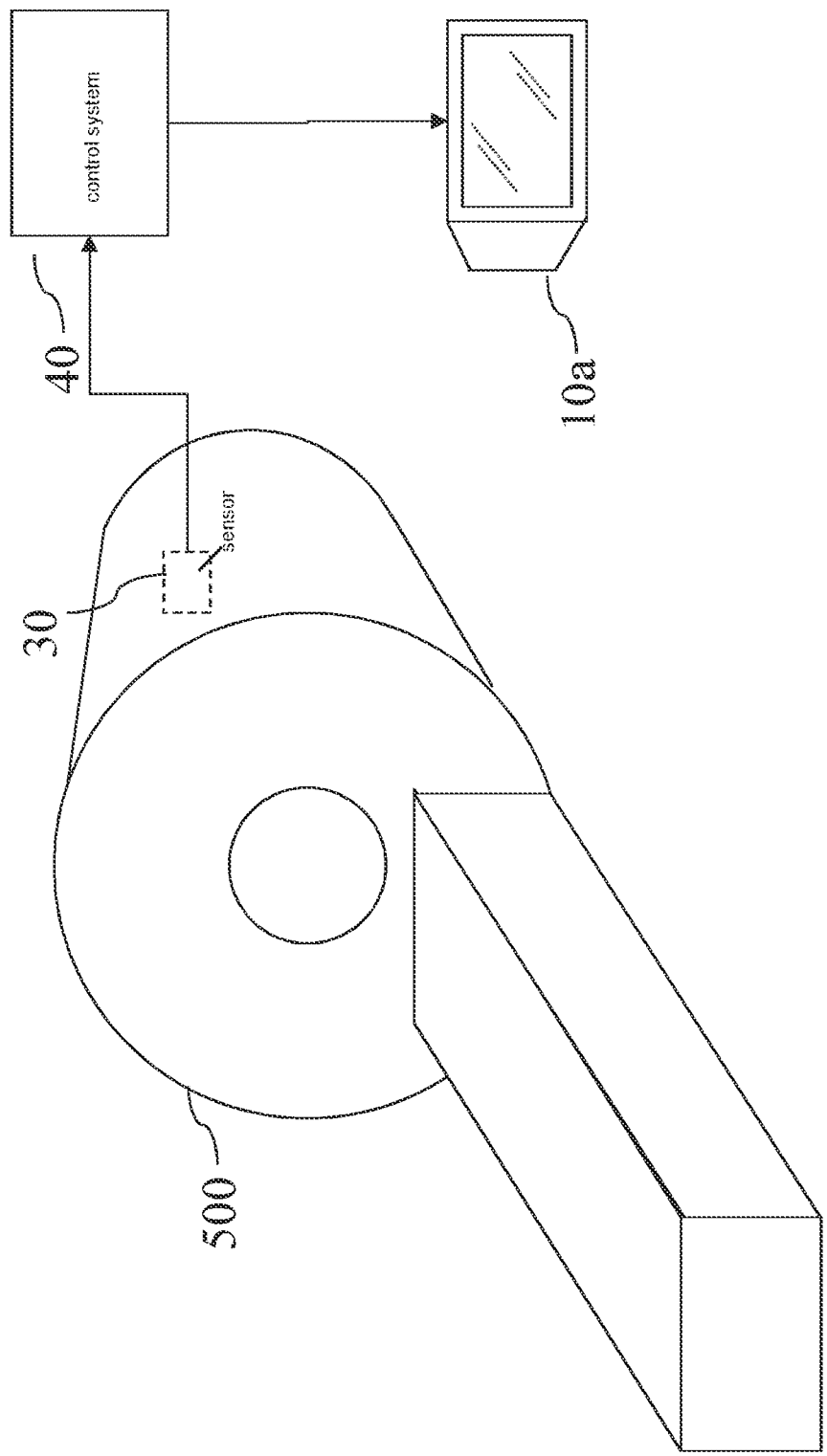
FIG. 7 shows schematically an exemplary embodiment for the control of a medical imaging system, in accordance with the present invention.

FIG. 7 shows an exemplary embodiment in which control system 40 is used for the control of a medical imaging system 500 such as an MRI, x-ray or ultrasonic device. Sensor 30, for instance, may be present in the form of an imaging sensor, and display unit 10*a* is actuated by control system 40. For example, neural network 60 is able to ascertain whether a region recorded by the imaging sensor is abnormal, and actuation signal A may then be selected in such a way that display unit 10*a* displays this region highlighted in color.

Figure 8:
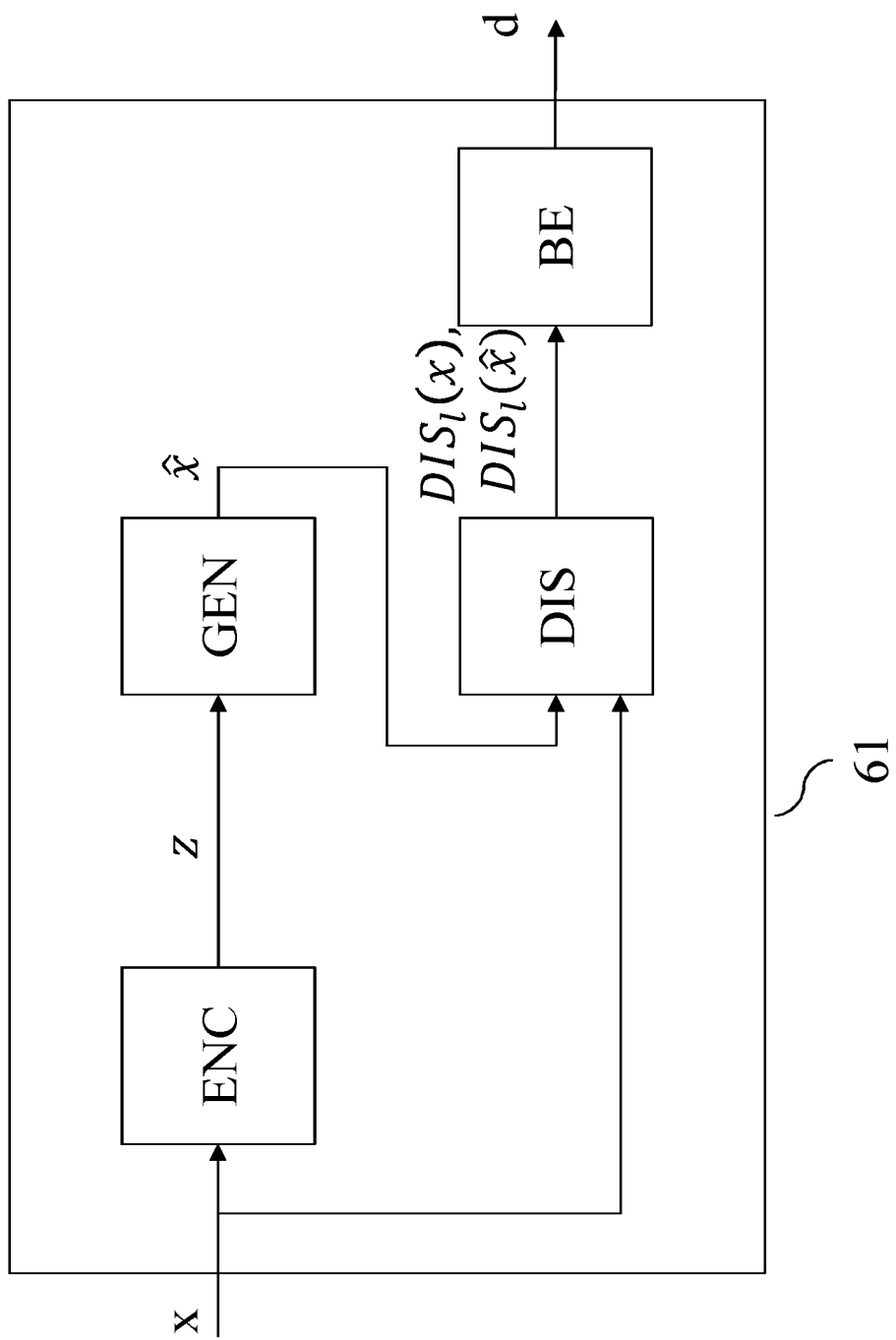
FIG. 8 shows a possible structure of the monitoring unit, in accordance with the present invention.

FIG. 8 shows a possible structure of monitoring unit 61. Input image x is conveyed to an encoder ENC, which uses it to ascertain what is known as a latent variable z. Latent variable z has a smaller dimensionality than input image x. This latent variable z is conveyed to a generator GEN, which uses it to generate a reconstructed image $\hat{x}$. In the exemplary embodiment, encoder ENC and generator GEN are provided in the form of a convolutional neural network in each case. Input image x and reconstructed image $\hat{x}$ are conveyed to a discriminator DIS. Discriminator DIS was trained to generate the best possible variable that characterizes whether an image conveyed to discriminator DIS is a real image or whether it was generated by generator GEN. This will be described in greater detail in the further text in connection with FIG. 10. Generator GEN, too, is a convolutional neural network.

Feature maps of an $l^{th}$ layer (l being a predefinable number), which result when input image x and reconstructed image $\hat{x}$ are conveyed to generator GEN, are denoted by $DIS_l(x)$ and $DIS_l(\hat{x})$ respectively. They are conveyed to an evaluator BE in which for example a reconstruction error $E_x = \|DIS_l(\hat{x}) - DIS_l(x)\|_2$. In an alternative embodiment (not shown), it is also possible to select the reconstruction error while circumventing discriminator DIS as $E_x = \|x - \hat{x}\|_2$.

Next, an anomaly value A(x) is able to be ascertained as the share of the particular input images of a reference dataset (e.g., a training dataset by which discriminator DIS and/or generator GEN and/or encoder ENC was or were trained), whose reconstruction error is smaller than ascertained reconstruction error $E_x$. If anomaly error A(x) is greater than a predefinable threshold value, then monitoring signal d is set to the value d=1, which signals that output variables y are potentially ascertained unreliably. In the other case, monitoring signal d is set to the value d=0, which signals that the ascertainment of output variables y is classified as reliable.

Figure 9:
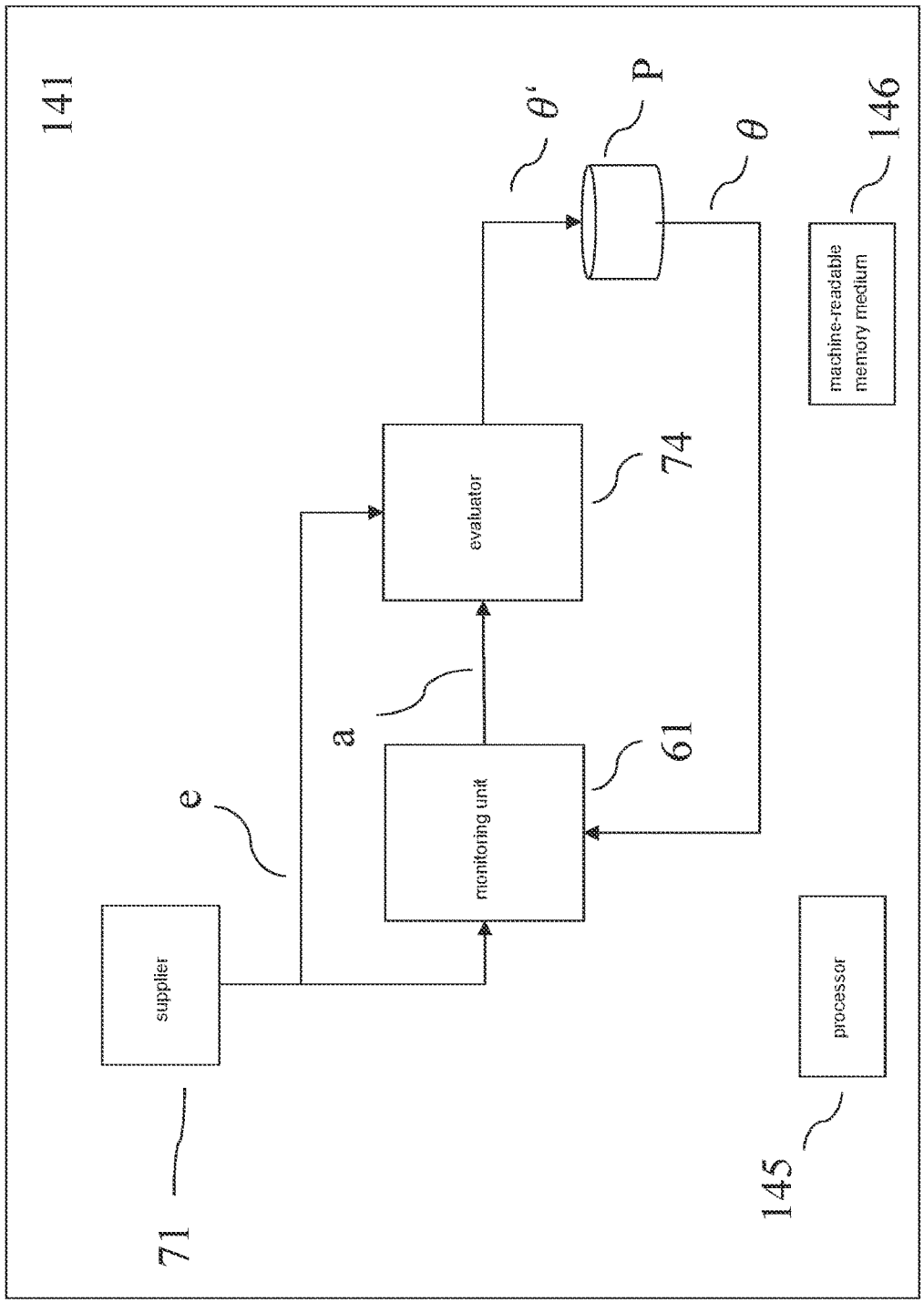
FIG. 9 shows a possible structure of a first training device 141, in accordance with the present invention.

FIG. 9 shows a possible structure of a first training device 141 for training monitoring unit 61. It is parameterized by parameters θ, which are supplied by parameter memory P. Parameters θ include generator parameters $\theta_{GEN}$, which parameterize generator GEN, encoding parameters $\theta_{ENC}$, which parameterize encoder ENC, and discriminator parameters $\theta_{DIS}$, which parameterize discriminator DIS.

Training device 141 includes a supplier 71, which supplies input images e from a training dataset. Input images e are conveyed to monitoring unit 61 to be trained, which uses them for ascertaining output variables a. Output variables a and input images e are conveyed to an evaluator 74, which ascertains new parameters θ' therefrom, as described in connection with FIG. 10, the new parameters being transmitted to parameter memory P where they replace parameters θ.

The methods executed by training device 141 are able to be implemented as a computer program on a machine-readable memory medium 146 and may be carried out by a processor 145.

Figure 10:
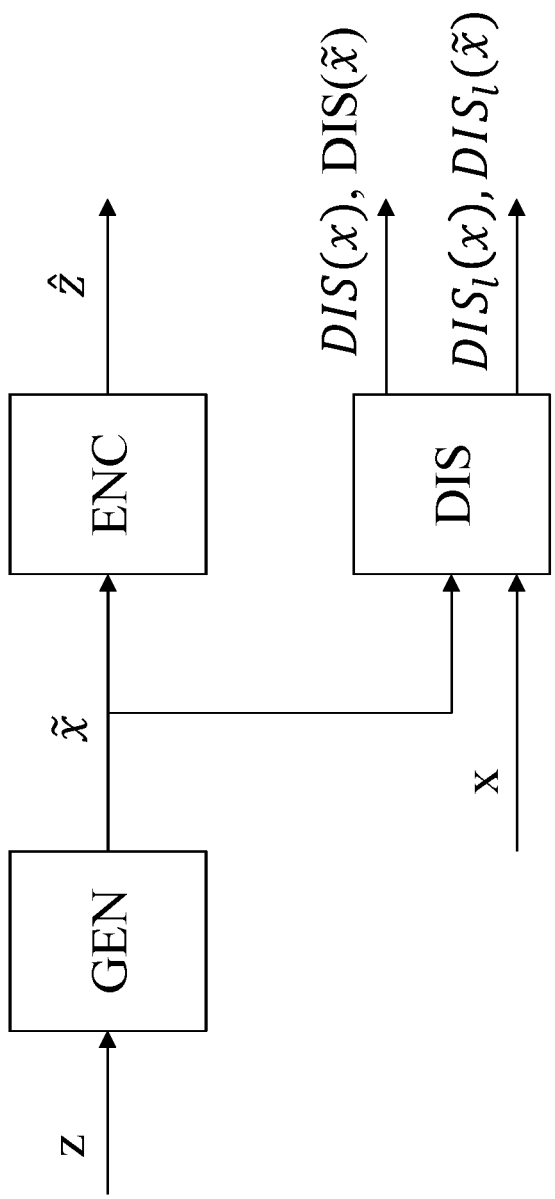
FIG. 10 shows the neural network system, in accordance with an example embodiment of the present invention.

FIG. 10 illustrates the interaction between generator GEN, encoder ENC and discriminator DIS during the training. The system of generator GEN, encoder ENC and discriminator DIS depicted here is also denoted as a neural network system in this document.

To begin with, discriminator DIS is trained. For instance, the following steps for training discriminator DIS may be repeated $n_{DIS}$ times, $n_{DIS}$ being a predefinable whole number.

First, a batch of real input images x is made available. They are denoted by $\{x^{(i)}\}_{i=1}^m \sim p_x(x)$ with a (generally unknown) probability distribution $p_x$. These input images $x^{(i)}$ are real images, which are supplied by a database, for instance. The totality of these input images is also referred to as a training dataset.

In addition, a batch of latent variables z is supplied as $\{z^{(i)}\}_{i=1}^m \sim p_z(z)$, which were randomly drawn from a probability distribution $p_z$. Probability distribution $p_z$ is a (multidimensional) standard normal distribution in this case.

A batch of random variables is furthermore supplied as $\{\epsilon^{(i)}\}_{i=1}^m \sim p_\epsilon(z)$, which were randomly drawn from a probability distribution $p_\epsilon$. Probability distribution $p_\epsilon$ is an equal distribution over the interval [0;1], for instance.

Latent variables z are conveyed to generator GEN and provide a constructed input image $\hat{x}$, i.e., $$\hat{x}^{(i)} \leftarrow GEN(z^{(i)}).$$

Using random variable $\epsilon$, an interpolation is carried out between input image x and constructed input image $\hat{x}$, i.e., $$x_{int}^{(i)} \leftarrow \epsilon x^{(i)} + (1-\epsilon)\hat{x}^{(i)}.$$

Using a predefinable gradient coefficient λ, which may be selected as λ=10, for example, a discriminator cost function $$\mathcal{L}_{DIS}^{(i)} \leftarrow DIS(\hat{x}^{(i)}) - DIS(x^{(i)}) + \lambda(|\nabla_{x_{int}} DIS(x_{int}^{(i)})|_2 - 1)^2$$

is then ascertained. New discriminator parameters $\theta_{DIS}'$ are able to be ascertained therefrom as $$\theta_{DIS}' = Adam\left(\nabla_{\theta_{DIS}} \frac{1}{m}\sum_{i=1}^m \mathcal{L}_{DIS}^{(i)}\right),$$

"Adam" representing a gradient descent method. This ends the training of discriminator DIS.

Generator GEN and encoder ENC are trained next. Here, too, real input images $\{x^{(i)}\}_{i=1}^m \sim p_x(x)$ and randomly selected latent variables $\{z^{(i)}\}_{i=1}^m \sim p_z(z)$ are supplied. Once again, $$\hat{x}^{(i)} \leftarrow GEN(z^{(i)})$$

is ascertained. It is used for ascertaining a reconstructed latent variable $\hat{z}$ in that constructed image $\hat{x}$ is conveyed to encoder ENC, i.e., $$\hat{z}^{(i)} \leftarrow ENC(\hat{x}^{(i)}).$$

In the same way, as illustrated in FIG. 8, an attempt is made to reconstruct input image x with the aid of encoder ENC and generator GEN, i.e., $$\hat{x}^{(i)} \leftarrow GEN(ENC(x^{(i)})).$$

A generator cost function $\mathcal{L}_{GEN}^{(i)}$, a reconstruction cost function $\mathcal{L}_{recon_x}^{(i)}$ of input image x and a reconstruction cost function $\mathcal{L}_{recon_z}^{(i)}$ of latent variable z are then ascertained as $$\mathcal{L}_{GEN}^{(i)} \leftarrow DIS(\hat{x}^{(i)})$$

$$\mathcal{L}_{recon_x}^{(i)} \leftarrow \|DIS_l(x^{(i)}) - DIS_l(\hat{x}^{(i)})\|_2^2$$

$$\mathcal{L}_{recon_z}^{(i)} \leftarrow \|z^{(i)} - \hat{z}^{(i)}\|_2^2.$$

New generator parameters $\theta_{GEN}'$ and new encoder parameters $\theta_{ENC}'$ are then ascertained as $$\theta_{GEN}' = Adam\left(\nabla_{\theta_{GEN}} \frac{1}{m}\sum_{i=1}^{m}(\mathcal{L}_{GEN}^{(i)} + \mathcal{L}_{recon_x}^{(i)})\right)$$

$$\theta_{ENC}' = Adam\left(\nabla_{\theta_{ENC}} \frac{1}{m}\sum_{i=1}^{m}\mathcal{L}_{recon_z}^{(i)}\right).$$

New generator parameters $\theta_{GEN}'$, new encoder parameters $\theta_{ENC}'$, and new discriminator parameters $\theta_{DIS}'$ then replace generator parameters $\theta_{GEN}$, encoder parameters $\theta_{ENC}$ and discriminator parameters $\theta_{DIS}$.

At this point, a convergence of parameters θ is able to be checked, and the training of discriminator DIS and/or of generator GEN and encoder ENC possibly be repeated until a convergence is achieved. This ends the present method.

Figure 11:
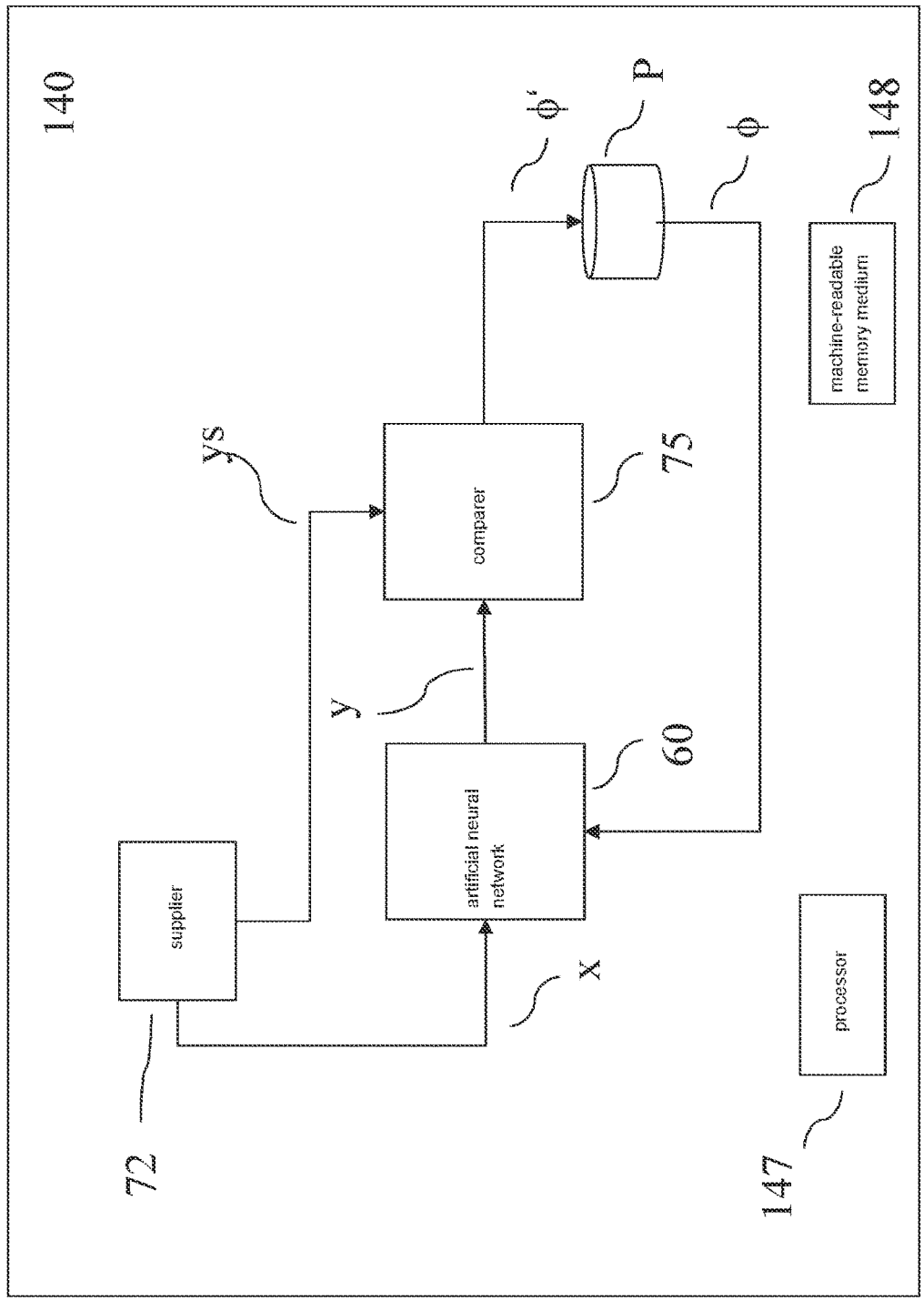
FIG. 11 shows a possible structure of a second training device 140, in accordance with the present invention.

FIG. 11 shows an exemplary second training device 140 for training neural network 60. Training device 140 includes a supplier 72, which supplies input images x and setpoint output variables ys, such as setpoint classifications. Input image x is conveyed to artificial neural network 60 to be trained, which uses it to ascertain output variables y. Output variables y and setpoint output variables ys are conveyed to a comparer 75, which ascertains new parameters φ' therefrom as a function of an agreement between respective output variables y and setpoint output variables ys, the new parameters being transmitted to parameter memory P where they replace parameters θ.

The methods executed by training system 140 may be implemented as a computer program on a machine-readable memory medium 148 and executed by a processor 147.

A dataset that includes input images x and associated setpoint output variables ys may be augmented or generated (e.g., by supplier. 72) in the following manner. To begin with, a dataset including input images $x^{(i)}$ is made available. They are classified according to predefinable characteristics (denoted as "A" and "B" by way of example) of a feature. For instance, vehicles may be classified according to the feature 'headlights switched on' or 'headlights switched off', or identified cars may be classified according to the type "passenger car" or "station wagon". Also, different characteristics of the feature "hair color" for detected pedestrians are possible. Depending on the particular characteristic of this feature, the input images $x^{(i)}$ are subdivided into two sets, i.e., $I_A\{i|x^{(i)}$ has the characteristic "A"} and $I_B=\{i|x^{(i)}$ has the characteristic "B"}. In an advantageous manner, these sets furthermore are homogenized to the effect that input images $x^{(i)}$ have the same characteristic X for a predefinable set of other features, preferably of all other features, that is to say, $I_A \leftarrow I_A \cap \{i|x^{(i)}$ has the characteristic X}

$I_B \leftarrow I_B \cap \{i|x^{(i)}$ has the characteristic X}.

With the aid of encoder ENC, associated latent variables $z^{(i)}=ENC(x^{(i)})$ are then ascertained for each one of input images $x^{(i)}$.

The average values of the latent variables are ascertained across the sets, i.e., $$\bar{z}_A = \frac{1}{|I_A|}\sum_{i\in I_A}z^{(i)}, \bar{z}_B = \frac{1}{|I_B|}\sum_{i\in I_B}z^{(i)}.$$

Next, the differences of the average values are formed, i.e., $$v_{A-B}=\bar{z}_B-\bar{z}_A.$$

For images from set $I_A$, new latent variables are now formed with a predefinable scale factor α, which may assume values between 0 and 1, for instance, that is to say, $$z_{new}^{(i)}=z^{(i)}+\alpha*v_{A-B}, i\in I_A.$$

Accordingly, new latent variables are able to be formed for images from the set $I_B$ as $$z_{new}^{(i)}=z^{(i)}-\alpha*v_{A-B}, i\in I_B.$$

From this, new images $x_{new}^{(i)}$ are able to be generated by $$x_{new}^{(i)} \leftarrow ENC(z_{new}^{(i)}).$$

It is of course not necessary to classify whole images. It is possible, for example, to use a detection algorithm for classifying image segments as objects, that these image segments are then cut out, a new image segment (according to new image $x_{new}^{(i)}$) is generated as the case may be, and is inserted into the associated image in place of the cut-out image segment. For example, this makes it possible to selectively adapt the hair color of a pedestrian in an image featuring this detected pedestrian.

With the exception of the classification of the feature varied in this way between characteristic "A" and "B", associated setpoint output variable ys may be adopted in unchanged form. This makes it possible to generate the augmented dataset and to train neural network 60 with this augmented dataset. The method then ends.

The term 'computer' encompasses various devices for processing predefinable processing rules. These processing rules may be present in the form of software or in the form of hardware or also in a mixed form of software and hardware.

The invention claimed is:

1. A computer-implemented neural network system, comprising:
    a first machine learning system including a first neural network;
    a second machine learning system including a second neural network; and
    a third machine learning system including a third neural network;
    wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image.

2. A method for training the neural network system, the neural network system including a first machine learning system including a first neural network, a second machine learning system including a second neural network, and a third machine learning system including a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the method comprising:

training the first machine learning system so that an activation in a predefinable feature map of feature maps of the third machine learning system assumes the same value when it receives a real image or an image of the real image reconstructed from a series connection made up of the second machine learning system and the first machine learning system;

wherein the second machine learning system is trained so that the reconstruction of the predefinable low-dimensional latent variable ascertained by a series connection made up of the first machine learning system and the second machine learning system is similar to the predefinable low-dimensional latent variable.

3. The method as recited in claim 2, wherein the first machine learning system is trained also to the effect that the third machine learning system does not recognize that an image it receives that was generated by the first machine learning system is not a real image.

4. The method as recited in claim 2, wherein the third machine learning system is trained so that it recognizes that an image it has received that was generated by the first machine learning system is not a real image.

5. The method as recited in claim 4, wherein the third machine learning system is trained also to the effect that it recognizes that a real image it receives is a real image.

6. A training device configured to train the neural network system, the neural network system including a first machine learning system including a first neural network, a second machine learning system including a second neural network, and a third machine learning system including a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the training device configured to:

train the first machine learning system so that an activation in a predefinable feature map of feature maps of the third machine learning system assumes the same value when it receives a real image or an image of the real image reconstructed from a series connection made up of the second machine learning system and the first machine learning system;

wherein the second machine learning system is trained so that the reconstruction of the predefinable low-dimensional latent variable ascertained by a series connection made up of the first machine learning system and the second machine learning system is similar to the predefinable low-dimensional latent variable.

7. A method for monitoring a correct operation of a machine learning system including a fourth neural network for classification and/or semantic segmentation of an input image it receives, using a monitoring unit which includes a first machine learning system of a neural network system and a second machine learning system of the neural network system, the neural network system further including a third machine learning system which includes a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the first machine learning system being trained so that an activation in a predefinable feature map of feature maps of the third machine learning system assumes the same value when it receives a real image or an image of the real image reconstructed from a series connection made up of the second machine learning system and the first machine learning system, the second machine learning system being trained so that the reconstruction of the predefinable low-dimensional latent variable ascertained by a series connection made up of the first machine learning system and the second machine learning system is similar to the predefinable low-dimensional latent variable, the method comprising:

conveying the input image to the second machine learning system, which uses the input image to ascertain a low-dimensional latent variable from which the first machine learning system ascertains a reconstruction of the input image; and determining, as a function of the input image and the reconstructed input image, whether or not the machine learning system is robust.

8. The method as recited in claim 7, wherein the monitoring unit also includes the third machine learning system of the neural network system, and a decision as to whether or not the machine learning system is robust is made as a function of which value the activation in the predefinable feature map of the third machine learning system assumes when it receives the input image and which value the activation in the predefinable feature map of the third machine learning system assumes when it receives the reconstructed input image.

9. The method as recited in claim 7, wherein the machine learning system and the neural network system were trained using datasets that include the same input images.

10. The method as recited in claim 7, wherein an actuation signal, for an actuation of an actuator, which is supplied as a function of an output signal of the machine learning system, is selected as a function of the determination of whether or not the machine learning system is robust.

11. A monitoring unit configured to monitor a correct operation of a machine learning system including a fourth neural network for classification and/or semantic segmentation of an input image it receives, the monitoring unit comprising:

a first machine learning system of a neural network system and a second machine learning system of the neural network system, the neural network system further including a third machine learning system which includes a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the first machine learning system being trained so that an activation in a predefinable feature map of feature maps of the third machine learning system assumes the same value when it receives a real image or an image of the real image reconstructed from a series connection made up of the second machine learning system and the first machine learning system, the second machine learning system being trained so that the reconstruction of the predefinable low-dimensional latent variable ascertained by a series connection made up of the first machine learning system and the second machine learning system is similar to the predefinable low-dimensional latent variable;

wherein the monitoring unit is configured to:

convey the input image to the second machine learning system, which uses the input image to ascertain a low-dimensional latent variable from which the first machine learning system ascertains a reconstruction of the input image; and determine, as a function of the input image and the reconstructed input image, whether or not the machine learning system is robust.

12. A method for generating an augmented training dataset including input images for training a machine learning system that is configured for classification and/or semantic segmentation of input images, the method comprising:

ascertaining latent variables from each of the input images using a second machine learning system of a trained neural network system, the trained neural network system further including a first machine learning system including a first neural network, and a third machine learning system including a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the trained neural network system being trained by training the first machine learning system so that an activation in a predefinable feature map of feature maps of the third machine learning system assumes the same value when it receives a real image or an image of the real image reconstructed from a series connection made up of the second machine learning system and the first machine learning system, and by training the second machine learning system so that the reconstruction of the predefinable low-dimensional latent variable ascertained by a series connection made up of the first machine learning system and the second machine learning system is similar to the predefinable low-dimensional latent variable;

classifying the input images into image classes as a function of ascertained feature characteristics of image data of the input images; and ascertaining each augmented input image of the augmented training dataset from at least one of the input images as a function of average values of the ascertained latent variables in at least two of the image classes.

13. The method as recited in claim 12, wherein the image classes are selected in such a way that the input images classified in the image classes agree with regard to their characteristics in a predefinable set of other features.

14. The method as recited in claim 12, wherein each augmented input image is ascertained using the first machine learning system of the neural network system as a function of an ascertained augmented latent variable.

15. The method as recited in claim 14, wherein the augmented latent variable is ascertained from a predefinable one of the ascertained latent variables and a difference of the average values.

16. The method as recited in claim 15, wherein the difference is weighted by a predefinable weighting factor.

17. The method as recited in claim 12, wherein the machine learning system is trained by the generated augmented training dataset when a monitoring of the machine learning system reveals that the machine learning system is not robust.

18. A training device configured to generate an augmented training dataset including input images for training a machine learning system that is configured for classification and/or semantic segmentation of input images, the training device configured to:

ascertain latent variables from each of the input images using a second machine learning system of a trained neural network system, the trained neural network system further including a first machine learning system including a first neural network, and a third machine learning system including a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the trained neural network system being trained by training the first machine learning system so that an activation in a predefinable feature map of feature maps of the third machine learning system assumes the same value when it receives a real image or an image of the real image reconstructed from a series connection made up of the second machine learning system and the first machine learning system, and by training the second machine learning system so that the reconstruction of the predefinable low-dimensional latent variable ascertained by a series connection made up of the first machine learning system and the second machine learning system is similar to the predefinable low-dimensional latent variable;

classify the input images into image classes as a function of ascertained feature characteristics of image data of the input images; and ascertain each augmented input image of the augmented training dataset from at least one of the input images as a function of average values of the ascertained latent variables in at least two of the image classes.

19. A non-transitory machine-readable memory medium on which is stored a computer program for training the neural network system, the neural network system including a first machine learning system including a first neural network, a second machine learning system including a second neural network, and a third machine learning system including a third neural network, wherein the first machine learning system is configured to ascertain a higher-dimensional constructed image from a predefinable low-dimensional latent variable, the second machine learning system being configured to reconstruct the predefinable low-dimensional latent variable from the higher-dimensional constructed image, and the third machine learning system being configured to distinguish whether or not an image the third machine learning system receives is a real image, the computer program, when executed by a computer, causing the computer to perform:

training the first machine learning system so that an activation in a predefinable feature map of feature maps of the third machine learning system assumes the same value when it receives a real image or an image of the real image reconstructed from a series connection made up of the second machine learning system and the first machine learning system; and training the second machine learning system so that the reconstruction of the predefinable low-dimensional latent variable ascertained by a series connection made up of the first machine learning system and the second machine learning system is similar to the predefinable low-dimensional latent variable.

\* \* \* \* \*